Figure 1:
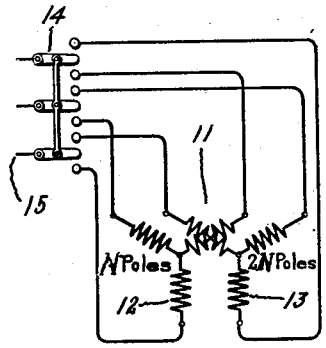
Figure 1:
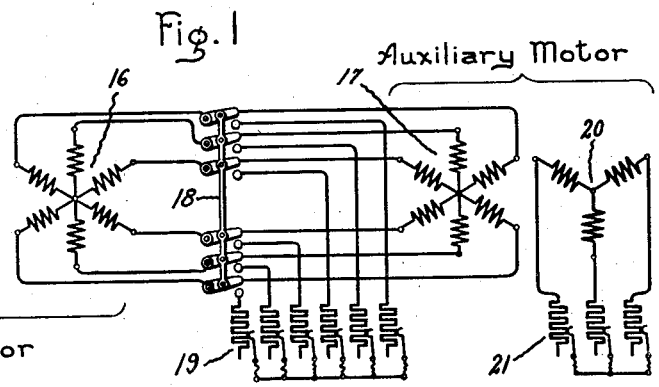

J. MARTIN.
INDUCTION MOTOR.
APPLICATION FILED JAN. 12, 1920.

1,366,580.

Patented Jan. 25, 1921.
3 SHEETS—SHEET 1.

Inventor:
John Martin,
by Albert G. Davis
His Attorney.

Inventor:
John Martin,
by *Albert G. Davis*
His Attorney.

UNITED STATES PATENT OFFICE.

JOHN MARTIN, OF RUGBY, ENGLAND, ASSIGNOR TO GENERAL ELECTRIC COMPANY, A CORPORATION OF NEW YORK.

INDUCTION-MOTOR.

1,366,580.     Specification of Letters Patent.     Patented Jan. 25, 1921.

Application filed January 12, 1920. Serial No. 350,984.

*To all whom it may concern:*

Be it known that I, JOHN MARTIN, a subject of the King of Great Britain, residing at Rugby, county of Warwickshire, England, have invented certain new and useful Improvements in Induction-Motors, of which the following is a specification.

My invention relates to induction motors adapted to be operated in cascade.

The object of my invention is to provide means for securing a large number of possible speeds with two induction motors operating singly or in cascade without the necessity of complicated switching apparatus or a large number of separate windings on the machines.

For this purpose I provide two motors, one of which I shall term the main motor, and the other the auxiliary motor. The main motor may be operated alone or in cascade with the auxiliary motor, so as to obtain varying speeds. The primary member of the main motor is adapted to produce a rotating field having either N or 2N poles. The change in pole numbers may be effected by any well known means; for example, by two separate windings or by switching devices for varying the interconnections of the coils. The secondary of the main motor is of course phase wound, and arranged so that it is responsive to both of the pole numbers that may be produced by the primary. One way in which the main secondary winding may be made responsive to both of these pole numbers, is by using coils for this secondary winding having a pitch intermediate between the pitch of the poles when the machine is operating with N poles and 2N poles. This type of winding is usually known as a fractional pitch winding, and it has been found that such a winding is well adapted to perform the functions as stated above. As thus far described, it is evident that the change from N to 2N poles on the main primary winding automatically causes the main secondary winding to be responsive to both pole numbers, without any additional means being necessary for accomplishing this purpose. The auxiliary motor has a primary winding adapted to be supplied from the secondary winding of the main motor. It has been found, and it will be shown, that if the auxiliary motor primary may be made up of coils having a fractional pitch as regards, say $n$ poles, then the change from N poles to 2N poles in the main motor will automatically produce a change from $n$ to $2n$ poles in the auxiliary motor. The secondary of the auxiliary motor may be either phase wound or of the squirrel cage type. The main and auxiliary motors operating in cascade may then have the two speeds corresponding to N+$n$ poles and also to 2 (N+$n$) poles.

The change from N to 2N poles in the main motor automatically produces the variation in pole numbers in the auxiliary motor, but it might be advantageous to vary the pole number for the auxiliary motor independently of the variation of pole numbers of the main motor. I accomplish this result by interposing suitable means, such as a double throw switch between the main motor secondary winding and the auxiliary motor primary winding, so arranged that by throwing the switch from one position to the other the number of poles produced by the auxiliary primary winding is changed either from $n$ to $2n$ or from $2n$ to $n$, irrespective of the number of poles on the main motor. The switching device of course may be of any well known type.

Figure 5:
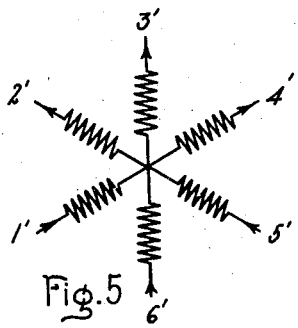
Figure 6:
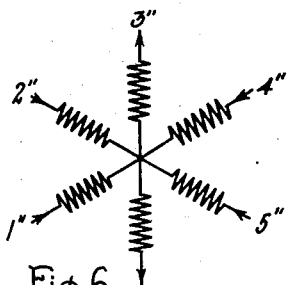
Figure 2:
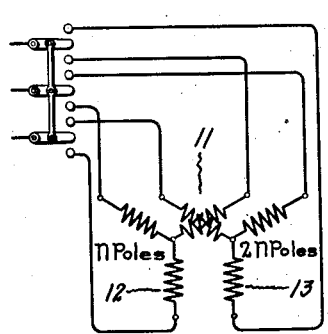
Figure 2:
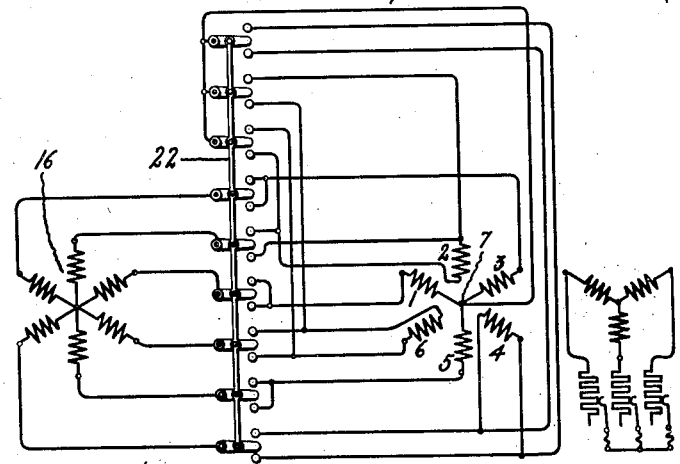
Figure 3:
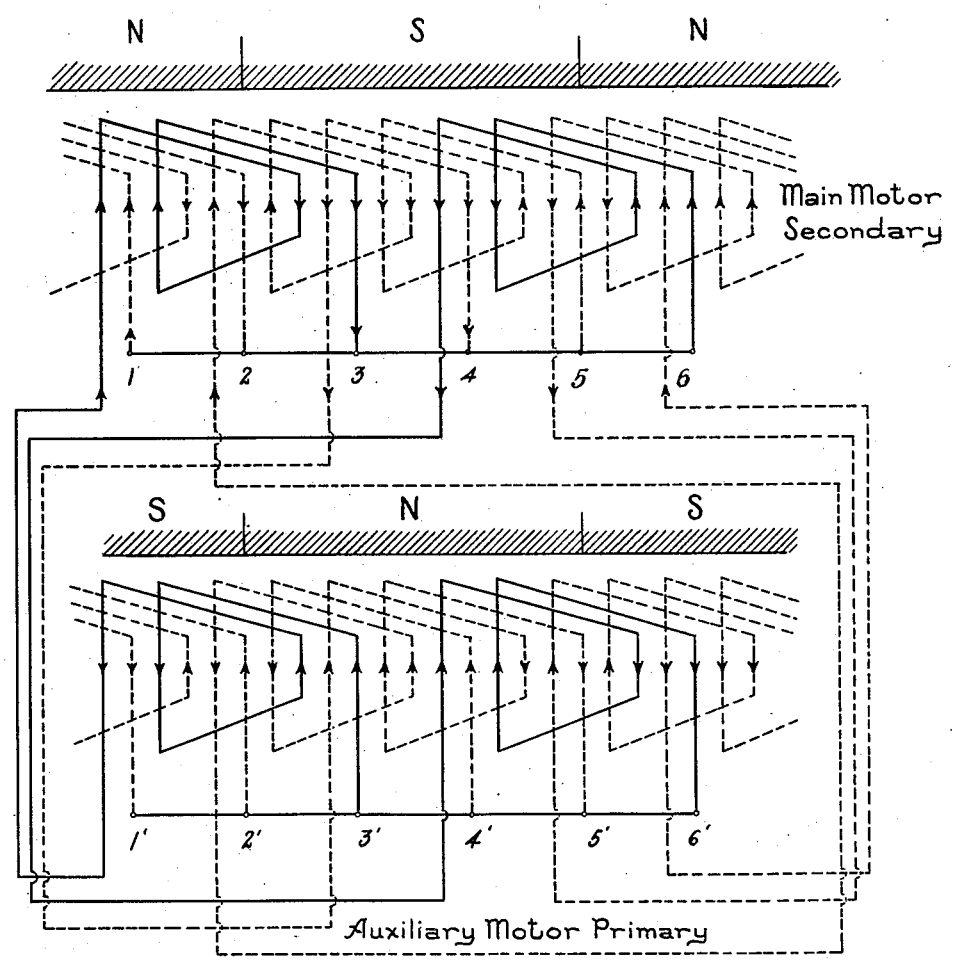
Figure 4:
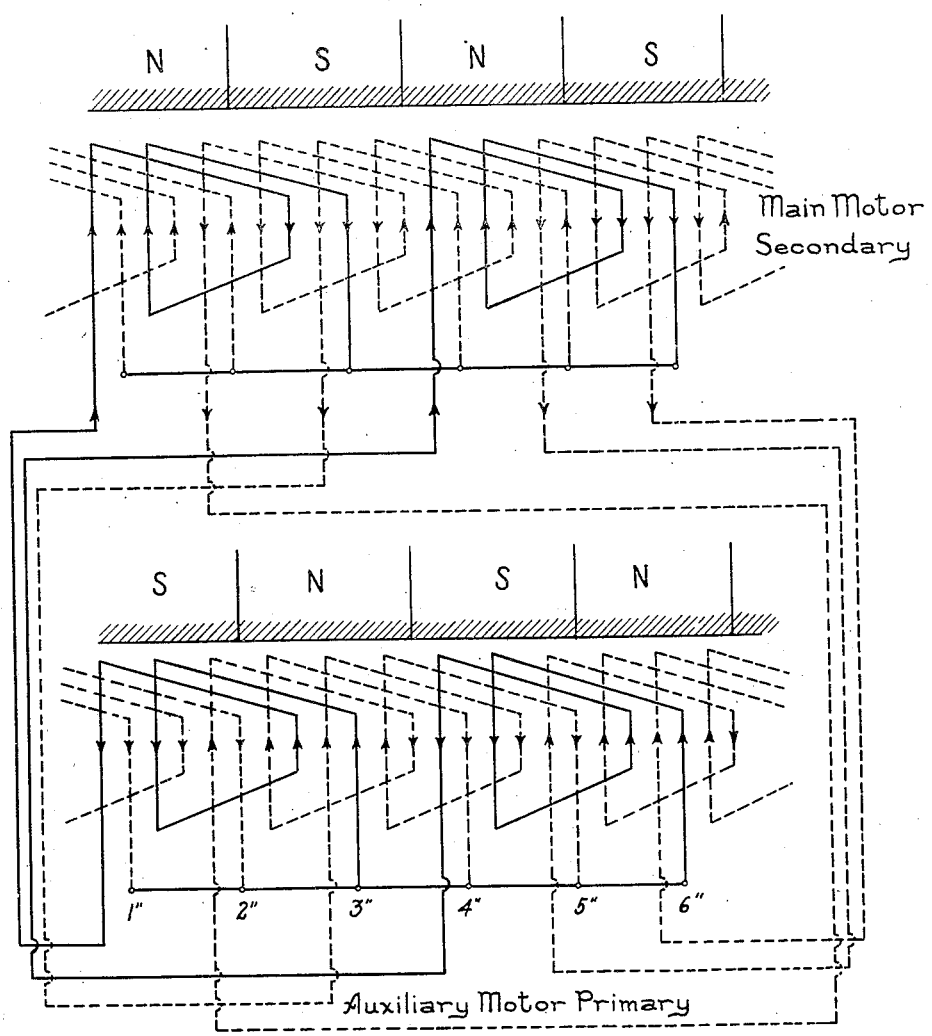

In order that my invention may be more readily understood, I illustrate it by means of the accompanying drawings in which Figure 1 is a diagrammatic wiring scheme showing the main and auxiliary motors connected as I have described; Fig. 2 shows a scheme similar to that shown in Fig. 1, with the addition of the double throw switch for independently varying the number of poles on the auxiliary motor primary winding; Figs. 3 and 4 show winding diagrams of the main motor secondary winding and the auxiliary motor primary winding for varying numbers of poles, and Figs. 5 and 6 are diagrammatic sketches showing the relation of the instantaneous current flow in the various phases of the auxiliary motor primary winding.

Referring now more in detail to the drawing, in which like reference characters refer to corresponding parts, the main motor primary member is shown at 11. In the present instance I have shown this primary member made up of two distinct windings 12 and 13, the winding 12 being adapted to produce N poles, and the winding 13 2N poles. The double throw switch 14 is adapted to connect either the winding 12 or 13 to the mains 15 supplied with alternating current. This method of securing a variation of pole numbers in the main motor is merely diagrammatic, and it must be understood that any other well known means for accomplishing this result may be used. The main motor secondary 16 is here shown by way of example as a six phase winding. The coils for this secondary winding have a fractional pitch with respect to N poles, so that the secondary 16 may respond either to N poles or to 2N poles on the main motor primary. The main motor secondary winding is adapted to be connected in cascade relation with the auxiliary motor primary 17 shown as wound likewise with six phases. By the aid of a double throw switch 18 the main motor secondary winding may be connected either to a polyphase rheostat 19 or to the auxiliary motor primary winding 17. The auxiliary motor secondary member 20 is shown in this instance as a polyphase winding adapted to be connected to a polyphase rheostat 21. This secondary member however may be of any other type. The arrangement of the windings may be such as to preclude the use of collector rings; for example, the primary 17 of the auxiliary motor may be the revolving member as well as the secondary 16 of the main motor. In this way sliding contacts may be entirely obviated.

By referring to Figs. 3 and 4 of the drawing the nature of the windings utilized for the main motor secondary and the auxiliary motor primary may be readily appreciated. In Fig. 3 the auxiliary motor primary winding is connected in cascade with the main motor secondary winding when the latter winding is revolving in a field of N poles, and the auxiliary motor primary winding therefore produces $n$ poles. In this case the number of poles on a primary of the main motor is assumed to be two and the number of poles produced by the auxiliary motor primary is also assumed to be two. The neutral connections for the six phases in the two windings are shown by the horizontal lines between the numerals 1 and 7 and the numerals 1' and 6'. When there are two poles produced by the primary of the main motor, the directions of the currents in the coils of the main motor secondary are shown by the arrows. The six phases of the auxiliary motor primary are connected each in series with the six phases of the main motor secondary, as shown in this figure, with the result that the currents flowing in the auxiliary motor primary flow in the direction indicated by the arrows thereon. By noticing how these arrows arrange themselves, it is plain that there are two poles produced by this winding. The numerals 1 to 6 indicate the connection points of the six phases in the main motor secondary to the common connecting wire, and in the same way numerals 1' to 6' indicate the connections to the common wire of the six phases in the auxiliary motor primary winding. A diagrammatic representation showing whether the instantaneous currents in the various phases flow toward or away from the common connection, is given by Fig. 5. In this figure the numerals 1' to 6' indicate the corresponding six phases of the auxiliary motor primary and the arrows show the direction of the currents in these phases at any particular instant.

Assuming that the main motor primary member is producing 2N poles, in this case four poles, the conditions brought about by the same conections as before are illustrated in Fig. 4 of the drawing. By noticing the direction of the arrows showing the flow of currents in the auxiliary motor primary, it will be seen that this primary winding must produce twice as many poles as it did before, or in this case four poles. The common connection for the six phases is here shown by the horizontal line 1''—6''. The diagram showing whether the instantaneous currents in the various phases flow toward or from the common connection, is given by Fig. 6. Now comparing Figs. 5 and 6, it is apparent that the change from $n$ to $2n$ poles, is due to the reversal of every alternate phase in the winding on the auxiliary motor primary. Thus, the arrows shown on phases 2', 4' and 6' of Fig. 5, are reversed as regards the arrows on phases 2'', 4'' and 6'' of Fig. 6. However, the direction of the currents in phases 1', 3' and 5' are unaltered. It is therefore evident that should some means be provided for reversing each alternate phase in the auxiliary motor primary winding, it would be possible to produce at will either $n$ or $2n$ poles thereby, independently of how many poles are produced by the main motor primary winding.

Such means I have shown in Fig. 2 of the drawing. In this figure the double throw switch 22 is adapted to reverse the phases marked 2, 4 and 6 when thrown from one position to the other, while leaving the connections for phases 1, 3 and 5 unaltered. The other parts of this figure correspond with those shown in Fig. 1. When the double throw switch 22 is in its lower position the connections diagrammatically represented by Fig. 1 obtain, while with the double throw switch 22 in its upper position the neutral point 7 of the auxiliary motor primary is connected with the outer terminal of phases 2, 4 and 6, while the inner terminals are connected to corresponding phases of the main motor secondary winding 16. As is evident, the provision of a single double throw switch 22 furnishes us with but one well known means for performing the function of reversing the alternate phases, any other well known switching means being available.

The speeds that I am able to get by my scheme may be indicated by the following table, where $f$ is the frequency of the source of supply:

(1) $\dfrac{f \times 120}{2(N+n)}$    (2) $\dfrac{f \times 120}{2N+n}$    (3) $\dfrac{f \times 120}{2N}$ (4) $\dfrac{f \times 120}{N+2n}$    (5) $\dfrac{f \times 120}{N+n}$    (6) $\dfrac{f \times 120}{N}$ The speeds given by (2) and (4) are obtained by the use of the switch 22 shown in Fig. 2. It is evident that when the main motor primary winding produces N poles the auxiliary motor primary winding may be made to produce either $n$ poles or $2n$ poles depending upon the position of the switch. The number of poles produced by the auxiliary motor primary winding is thus in reality a function of both conditions; first, whether the main motor primary winding produces N or 2N poles, and second, whether the double throw switch 22 be in its upper or lower position. Throwing the switch from one position to the other changes the number of poles produced by the auxiliary motor primary from $n$ to $2n$ or from $2n$ to $n$. In the same way a change in pole numbers of the main motor from N to 2N causes a variation in the pole numbers of the auxiliary motor.

While I have shown in the accompanying drawings the preferred embodiment of my invention, it is not limited thereto, and I aim in the appended claims to embrace all modifications falling fairly within the scope of my invention.

What I claim as new and desire to secure by Letters Patent of the United States, is,—

1. In combination, a main induction motor having a primary member, adapted to produce any of a plurality of pole numbers thereon, and a single unalterable secondary winding responsive to each of the pole numbers, and an auxiliary motor connected in cascade to the main motor.

2. In combination, a main induction motor having a primary member adapted to produce any of a plurality of pole numbers thereon, and a single unalterable secondary winding responsive to any of the pole numbers, and an auxiliary induction motor having a primary winding connected to the main secondary winding in cascade relation and adapted to produce poles varying in number in response to the variation in pole numbers of the main motor.

3. In combination, a main induction motor having a primary member adapted to produce either N or 2N poles thereon, and a secondary winding wound with coils having a pitch intermediate the two pitches for the two pole numbers, and an auxiliary induction motor having its primary winding connected in cascade relation with the main motor secondary winding, and wound with coils intermediate the two pitches for pole numbers of $n$ and $2n$.

4. In combination, a main induction motor having a primary member adapted to produce any of a plurality of pole numbers thereon, and a single unalterable main motor secondary winding responsive to any of the pole numbers, an auxiliary induction motor having a primary winding connected to the main motor secondary winding in cascade relation, and switching means, the number of poles produced by the auxiliary motor primary winding being a function both of the number of poles on the main motor and of the position of the switching means.

5. In combination, a main induction motor having a primary member adapted to produce either N or 2N poles thereon, and a secondary winding responsive to both of said pole numbers, an auxiliary induction motor having a primary winding adapted to be connected to the main motor secondary winding in cascade relation, and means for effecting the connection between the auxiliary motor primary winding and the main motor secondary winding, said means comprising a double throw switch for reversing certain of the phase windings on the auxiliary motor primary winding, the number of poles produced by said primary winding being either $n$ or $2n$ dependent both upon the position of said switch and upon the number of poles on the main motor.

6. In combination, a main induction motor having a primary member adapted to produce either N or 2N poles thereon, and a secondary winding wound with coils having a pitch intermediate the two pitches for the two pole numbers, an auxiliary induction motor having a primary winding adapted to be connected in cascade relation with the main motor secondary winding wound with coils intermediate the two pitches for pole numbers of $n$ and $2n$, and means for effecting the connection between the auxiliary motor primary winding and the main motor secondary winding, said means comprising a double throw switch for reversing certain of the phase windings on the auxiliary motor primary winding, the number of poles produced by said primary winding being dependent both upon the position of said switch and upon the number of poles on the main motor.

In witness whereof, I have hereunto set my hand this seventeenth day of December, 1919.

JOHN MARTIN

Witnesses:
  John Halford,
  Dorothy White.